United States Patent [19]

Bartschi et al.

[11] Patent Number: 5,734,976

[45] Date of Patent: Mar. 31, 1998

[54] MICRO-RECEIVER FOR RECEIVING A HIGH FREQUENCY FREQUENCY-MODULATED OR PHASE-MODULATED SIGNAL

[75] Inventors: Anton Bartschi, St. Antoni; Francois Callias, Neuenburg, both of Switzerland

[73] Assignee: Phonak Communications AG, Murten, Switzerland

[21] Appl. No.: 399,586

[22] Filed: Mar. 7, 1995

[30] Foreign Application Priority Data

Mar. 7, 1994 [EP] European Pat. Off. .............. 94810143

[51] Int. Cl.$^6$ ................................................ H04B 1/28
[52] U.S. Cl. ..................... 455/333; 455/280; 455/338; 381/68.6
[58] Field of Search ................................ 455/205, 209, 455/212, 218, 266, 280, 333, 334, 338, 340, 38.3, 343, 312, 339, 307, 213; 381/68.2, 68.4, 68.6, 79; 343/876, 725, 726

[56] References Cited

U.S. PATENT DOCUMENTS

| | | | |
|---|---|---|---|
| 3,979,679 | 9/1976 | Bush et al. ........................ | 455/213 |
| 4,207,590 | 6/1980 | Naimpally et al. | |
| 4,332,032 | 5/1982 | Daniel . | |
| 4,761,829 | 8/1988 | Lynk, Jr. et al. .................. | 455/312 |
| 4,873,527 | 10/1989 | Tan . | |
| 5,020,147 | 5/1991 | Okanobu ........................... | 455/234.1 |
| 5,402,494 | 3/1995 | Flippe et al. ...................... | 381/68.6 |
| 5,498,885 | 3/1996 | Deen et al. . | |
| 5,519,762 | 5/1996 | Barlett .............................. | 455/343 |

FOREIGN PATENT DOCUMENTS

| | | |
|---|---|---|
| 3032311 | 3/1981 | Germany . |
| 3826294 | 4/1992 | Germany . |

OTHER PUBLICATIONS

Song et al., "A CMOS Double–Heterodyne FM Receiver", 8107 IEEE Journal of Solid–State Circuits, SC–21(1986), Dec., No. 6, New York USA.

Dooremolen et al., "A complete f.m. radio on a chip", 8028 Electronic Components & Applns., vol. 5(1983) Jun., No. 3, Eindhoven, Nederland.

*Primary Examiner*—Chi H. Pham
*Assistant Examiner*—Gertrude Arthur
*Attorney, Agent, or Firm*—Oblon, Spivak, McClelland, Maier & Neustadt, P.C.

[57] ABSTRACT

A micro-receiver for receiving a high frequency frequency modulated or phase modulated signal, including a single integrated circuit in BiCMOS technology and on which is integrated a high frequency amplifier, an oscillator, a modulator, an intermediate frequency filter, an intermediate frequency amplifier, a demodulator, a low pass filter and a low frequency amplifier. The integrated circuit includes in addition a muting or squelch circuit, a voltage multiplier as well as a standby circuit. The circuits working in a lower frequency range are implemented in CMOS technology, and operated in a very energy-saving way with a single-cell battery with a low battery voltage of 1.3 V. The voltage multiplier provides a higher operating voltage for the circuits working in a higher frequency range. Because of the high degree of integration made possible by implementing the intermediate frequency and low frequency circuits in CMOS technology, it is possible to dispose the receiver, including a battery and earphone, in a housing which can be inserted into the external auditory canal of a person.

16 Claims, 5 Drawing Sheets

5,734,976

1

MICRO-RECEIVER FOR RECEIVING A HIGH FREQUENCY FREQUENCY-MODULATED OR PHASE-MODULATED SIGNAL

BACKGROUND OF THE INVENTION

1. Field of the Invention

This invention relates to a micro-receiver for receiving a high frequency frequency-modulated or phase-modulated signal, the receiver formed of plural circuits including at least an oscillator, a mixer stage intended to mix the high frequency modulated signal transmitted to the mixer stage with a signal generated by the oscillator and to generate an intermediate frequency signal, an intermediate frequency section, a demodulator and a low frequency amplifier from which an audio-frequency signal can be output, and a power source to supply the aforementioned modules with electrical energy.

2. Discussion of the Background

Known under the name TDA 7000 is an integrated circuit by the firm Philips to produce a miniaturized receiver to receive a high frequency frequency-modulated signal. Owing to the operating voltage needed therefor of typically 4.5 volts and the relatively large current consumption of this integrated circuit of about 8 mA, this module is not suitable for building an extremely miniaturized FM receiver, alone because of the relatively large battery required. A further impediment would be the relatively large number, over 20, of external components which would be necessary, in addition to the integrated circuit, to produce a receiver. The reason for this is in particular that the noted integrated circuit is constructed using solely bipolar technology, which practically excludes the possibility of integrating capacitors whereby, among other things, the production of completely integrated intermediate frequency filter configurations and low frequency filters is not made possible.

SUMMARY OF THE INVENTION

It is thus the object of the present invention to achieve a further-reaching miniaturization or extreme miniaturization of a receiver to receive high frequency frequency-modulated or phase-modulated signals than has been possible until now using the above-mentioned integrated circuit.

Another object of the present invention is to build a receiver as initially described so small that it can be accommodated, along with an energy source and an element generating an acoustic signal, for example in the external auditory canal of a person.

These and other objects are achieved, according to the present invention, in that at least the circuits necessary to produce an FM receiver, namely an oscillator, a mixer stage, an intermediate frequency filter configuration, a demodulator and a low frequency amplifier are contained in at most two integrated circuits and in that the power source is a single-cell battery or a single-cell accumulator.

In developing the circuits for the above-mentioned receiver, and in selecting the integration technologies for the individual circuits, a point of departure according to the present invention is that to operate the circuits only a single-cell battery or accumulator cell is necessary, i.e. that the modules could be operated with a voltage of at most 1.8 V and at least 1.0 V. Moreover by designing the circuits in an extremely energy-conserving technology, it is possible to reduce the current consumption of the entire receiver within a range of about 1 ma. The low operating voltage of typically about 1.3 V and the small current consumption make it possible to foresee a single hearing aid battery to operate the receiver. Thus achieved is a sufficiently long operating period of the receiver for the applications to be mentioned later.

At least a part of the circuits of the receiver module is designed in CMOS technology because with CMOS technology transistors with low threshold voltages and capacitors with relatively large capacitances are integratable. These advantages are used to integrate in CMOS technology all circuits which operate in a low frequency range. Through the selection of a relatively low intermediate frequency, it is possible to completely integrate as well the entire intermediate frequency section, including an intermediate frequency filter and an intermediate frequency amplifier without there being even a single external component. The modules working in a high frequency range, such as the high frequency amplifier, oscillator and mixer stage, are integrated in bipolar technology. Bipolar technology is chosen because of the high frequencies to be processed in these modules, which in the present case lie between about 30 and 200 MHz, and because components produced in CMOS technology are too slow for such applications. So that the higher threshold voltages of the transistors with the bipolar technology do not have a disadvantageous effect, a voltage multiplier circuit is integrated additionally to feed the modules provided in bipolar technology with a higher operating voltage generated internally in the integrated circuit.

A low pass filter circuit and a muting or respectively squelch circuit are preferably also integrated in the at most two integrated circuits.

A preferred embodiment foresees all the circuits already mentioned—the functioning of which will be explained further on—being contained in a single integrated circuit. This single integrated circuit is designed in BiCMOS technology.

Associated with the receiver is also a loop to form a magnetically operating antenna. It is preferably foreseen, however, to couple in addition an electrically operating wire antenna, rod antenna or loop antenna to the receiver so that weaker signals can be received too. A preferred embodiment foresees a configuration of the two antennas especially in the sense that the magnetically operating antenna becomes ineffective when the electrically operating antenna is connected and vice-versa.

Adjusting the mode of operation to receiving a high frequency frequency-modulated or high frequency phase-modulated signal can be accomplished with a manually insertable jumper.

The muting or squelch circuit monitors the level of the received amplified and demodulated signal. If this low frequency signal is smaller than a certain predetermined value, the bandwidth of the low pass filter circuit is automatically reduced, resulting in a better signal-to-noise ratio. If the low frequency signal is absent, or if it is so low it cannot be used, the low frequency amplifier is shut off.

Because it has now become possible to achieve an extremely high degree of integration for all the aforementioned circuits, and it has been possible to reduce the number of additionally required external components, all of which are preferably designed for surface mounting device (SMD) technique, to about half of that in the initially mentioned state of the art, operation of the receiver with a single hearing aid battery has become possible, and receiver volumes have been attained smaller than 1 cm$^3$ including all the above-mentioned parts. It has thereby become possible to place the receiver in a housing which is to be equated with the hearing aid to be worn in the ear. Also built into the housing, in addition to the receiver, is an earphone for emitting an acoustic signal. Such a receiver can be inserted in the external auditory canal of a person, and is suited, for example, in a disaster relief operation to direct individual disaster relief workers coordinated by one or more coordinating centers without the disaster relief workers having to carry around a wireless set with one hand blocked to operate the wireless set.

A different kind of application could be, for example, that a trainer directs the moves of his players during training or sports events from the edge of the playing field.

With hearing aids it is known that they have, in addition to a microphone, a so-called induction coil, it being possible by means of a switch to switch from microphone reception to induction coil reception. The induction coil reception serves above all the purpose of enabling the hearing aid wearer to follow events, for example church services, without the presence of the disturbing environmental noise also picked up by the microphone. Installation of induction loops in housings is relatively complex and costly, however, and therefore seldom carried out. Disadvantageous for the hearing aid wearer is that he can hardly perceive the other people around him acoustically during induction coil reception.

With the receiver according to the invention a new area of application opens up here too, namely the receiver can be designed so that it can be connected, for example, to a hearing aid as an accessory. Functionally the connection would have to take place both mechanically and electrically. It is not necessary, however, to have an earphone and a battery housed in the receiver accessory since these parts are already present in the hearing aid. A hearing aid worn behind the ear or hearing aid glasses are in mind for this application of the receiver according to the invention.

Further applications for the receiver constructed as an accessory for a hearing aid are, for example, in schools for hearing-impaired children and in the area of hearing aid wearers. In schools for the hearing impaired, the pupils can hear the teacher clearly and distinctly. The receivers used so far, which are about the size of a cigarette box and which have to be carried on a belt around the waist and connected with the hearing aid of the pupil by means of a cable, can be replaced. In the private sphere, the receiver accessory can be used to hear television sound, the sound of stereo equipment, the telephone or the doorbell. For these purposes, small, locally installed transmitters are additionally required.

In both named embodiments it should preferably be possible to connect the electrically operating antenna already mentioned from the outside to the receiver accommodated in the housing. The visual appearance would be that, for example, a short, flexible wire extends out of the external auditory canal in which the receiver is being worn or that a wire a few centimeters long hangs down from the hearing aid, which is absolutely undisturbed. The magnetically operating antenna associated with the receiver is thereby switched off. Preferably the integrated circuit also includes a standby circuit which begins functioning only when the receiver is used as an accessory for a hearing aid. It allows switching the receiver on and off simultaneously when the hearing aid is switched on or off.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
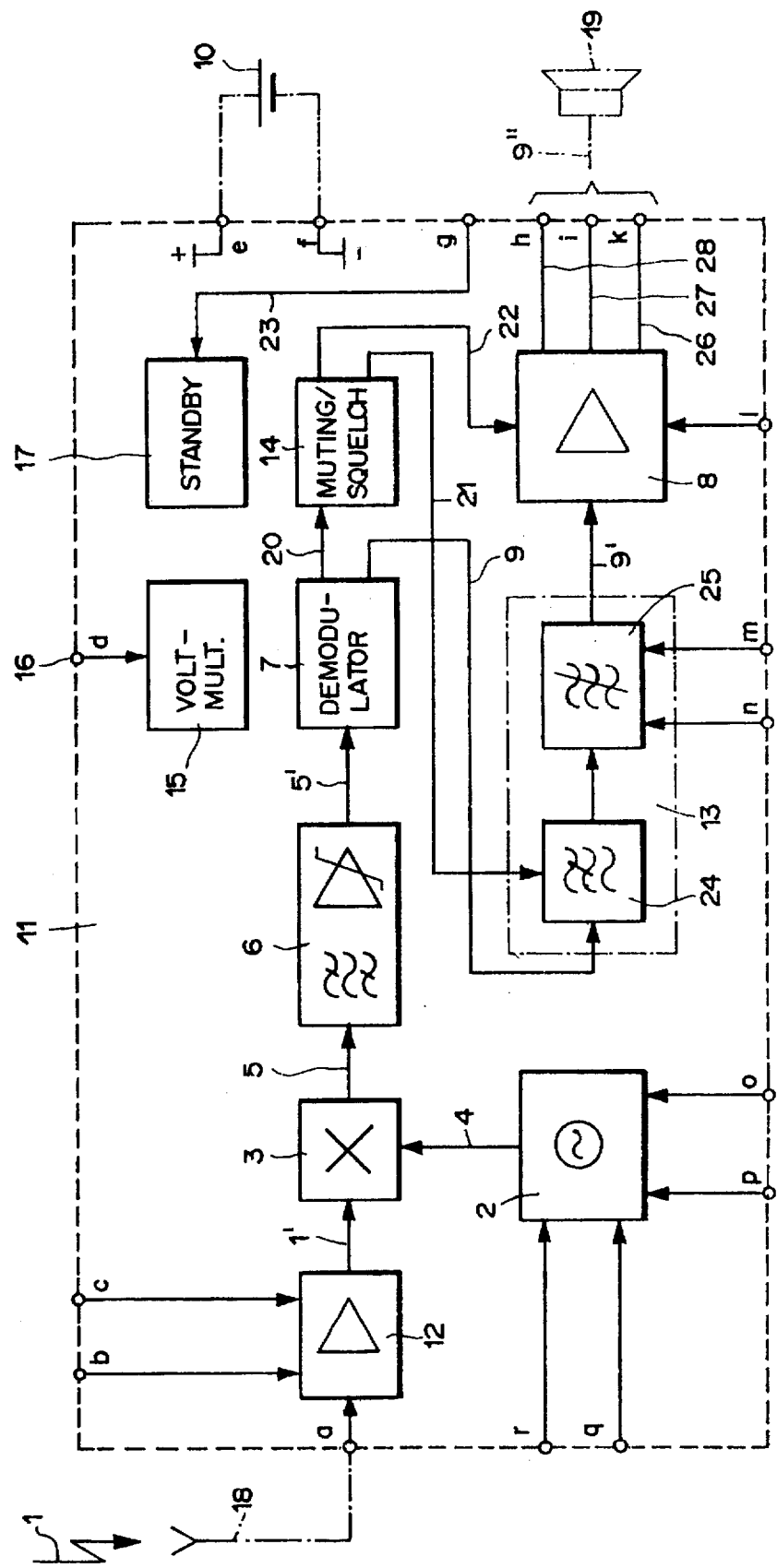
FIG. 1 is a block diagram of the design of the integrated circuit for the receiver.

Referring now to the drawings, wherein like reference numerals designate identical or corresponding parts throughout the several views, shown in FIG. 1 is an integrated circuit 11 intended for the production of a micro-receiver for receiving a high frequency signal 1, which is frequency-modulated or phase-modulated. The integrated circuit 11 includes points of connection 16, which are designated a to r and which are connected to further components mounted on a printed circuit board (not visible in this figure), preferably in SMD (surface-mounted-device) technology.

The integrated circuit 11 is designed in BiCMOS technology. Bipolar transistors are used in connection with integrated resistors and external inductances and capacitances to design circuits which process high frequencies. Transistors in CMOS technology are foreseen to realize the areas of the circuit which operate in a middle or low frequency range, for example the circuits for filtering and amplifying an intermediate frequency signal and a low frequency signal. The CMOS technology permits moreover the integration of capacitors with a respectable capacitance per surface unit which are suitable to realize both integrated RC filters and integrated filters with switched capacitances (switched capacitor).

In the embodiment shown, the integrated circuit 11 comprises a high frequency amplifier 12, which is intended for preamplification of the high frequency signal 1 received via an antenna 18 which is connected by a connection point a. The high frequency amplifier 12 is designed as a selective amplifier. The means for frequency selection are provided as external elements. An inductance and a capacitance, which are connected to the connection points b and c, are provided for this purpose. The preamplified and prefiltered high frequency signal 1' reaches a mixer stage 3. Also connected to the mixer stage 3 is an oscillator signal 4 generated by a crystal-controlled oscillator 2. Needed to operate the oscillator are further external elements, such as a quartz, inductances and capacitances which are connected to connection points o, p, q, and r.

In the mixer stage 3 the product of the two connected signals, the high frequency signal 1' and the signal 4 given by the oscillator 2, is formed. This signal 5 generated in the mixer stage has a frequency spectrum in the form of oscillator frequency±high frequency signal, three times the oscillator frequency±high frequency signal, five times the oscillator frequency+high frequency signal, etc. This signal 5 is transmitted to an intermediate frequency section 6 which includes an intermediate frequency filter (RC filter) and intermediate frequency amplifier. In the intermediate frequency section 6, there is a selective amplification of the mixer stage product, the oscillator frequency minus the high frequency signal. This mixer stage product is designated as the intermediate frequency 5'. So that the intermediate frequency section is fully integratable with its capacitors, resistors and transistors, it is implemented in CMOS technology. Since transistors in this technology, as stated in the introduction, are not suitable for higher frequencies, the oscillator frequency has been selected in such a way that the intermediate frequency signal has a frequency of only between 15 and 50 kHz. Through the application of CMOS technology and the selection of the low intermediate frequency there is the additional advantage that the current consumption of the intermediate frequency section is extremely minimal.

The receiver according to the invention is constructed as a superheterodyne receiver with a simple conversion of the signal received to the intermediate frequency signal with a very low selected intermediate frequency.

Owing to the low intermediate frequency, the frequencies of the high frequency signal to be received and of the high frequency signal with the image frequency are very close together. Reception of a high frequency signal with the image frequency can be prevented, on the one hand, with a selectively designed high frequency amplifier, and, on the other hand, with a selective antenna. In the present design, a complete rejection of the high frequency signal with the image frequency has been dispensed with because by choosing the very low intermediate frequency and by means of only a weak selectivity of the high frequency amplifier, the main emphasis of the circuit design has been placed on minimal current consumption and the smallest possible volume of the receiver to be realized (few external elements). To compensate the loss through selectivity, the selected spacing of effective channels to be received is large.

The intermediate frequency signal 5' is transmitted to a demodulator 7 in which a low frequency signal 9 is obtained from the intermediate frequency signal. This low frequency signal 9 is transmitted to a low pass filter circuit 13 which includes a low pass filter 24 and a tone correction circuit 25, as shown in FIG. 1. The filtered and possibly tone corrected low frequency signal passes from the low pass filter configuration 13 to a low frequency amplifier 8. This low frequency amplifier 8, designed as the output amplifier for the low frequency signal, comprises a connection point 1 to which can be connected an externally adjustable resistor or a switchable resistor network for adjustment of the loudness level. Three output ends, of differing types, 26, 27, 28, of the output amplifier end at connection points h, i, k of the integrated circuit 11. Depending upon use and application of the integrated circuit, an element 19 to generate an acoustic signal, for example an electromagnetic earphone, as described in detail later, is connected to one of the three connection points h, i, k. An amplified low frequency signal 9" is supplied to this earphone 19.

The demodulator 7 likewise delivers a reference signal 20 for a muting or squelch circuit 14, which controls the low pass filter 24 and the low frequency amplifier 8 via connections 21, 22. If no high frequency signal is received or if the signal-to-noise ratio of the low frequency signal is too low, for example with weak reception, the low frequency amplifier 8 is switched off via connection 22. This function is very well known as squelch or muting in FM receivers. In this preferred embodiment the switch of threshold of the squelch is firmly predetermined.

If a received signal grows weaker, the signal-to-noise ratio of the low frequency signal 9 becoming smaller, a muting or noise attenuation function of the muting or squelch module 14 is activated by means of which the band of low pass filter 24 is reduced via connection 21, whereby the signal-to-noise ratio is increased and the sensitivity of the receiver improved.

The tone correction circuit 25 is connected with the two points of connection n, m of the integrated circuit. If neither of these two points of connection is connected to a neutral terminal of the circuit, the reproduction curve of the tone correction circuit 25 is flat. If connection point n is connected to the neutral terminal of the circuit, which can happen, for example, with a jumper J1 or similar means, such as a common wire bridge, the tone correction element acts as a first order bandpass filter with a lower limiting frequency of about 200 Hz, correct reception of a phase-modulated signal being ensured. With open connection point n, the receiver is set to receive a frequency-modulated signal.

If the connection point m (jumper J2) is connected to the neutral terminal of the circuit, the tone correction circuit 25 acts as a bandpass filter with limiting frequencies of about 160 Hz and about 1600 Hz, which permits reproducing the frequency response of a directional microphone of a hearing aid. This is important when the receiver is used as an accessory for a hearing aid since in this way it can be achieved that the acoustic pattern of the hearing aid does not change when it receives a signal demodulated from the high frequency signal, instead of acoustic signals, over the directional microphone.

With a hearing aid equipped with a microphone without marked directional character, the reproduction curve of the microphone is flat. The frequency response of such a microphone can be simulated by separating the connection in from the neutral terminal.

A voltage multiplier circuit 15, to which is connected an external balancing capacitor via connection point d, acts to generate a higher voltage, starting from the voltage applied by a single-cell battery or a single-cell accumulator 10 to the integrated circuit 11 between the connection points e, f in order to supply with electricity those modules of the integrated circuit which require a minimal operating voltage greater than 1 V (for example, high frequency amplifier 12).

A standby circuit 17 completes the integrated circuit 11 in the sense that a voltage applied at connection point g is constantly monitored via a control signal connection 23. In the case where the voltage monitored is low or absent, the standby circuit 17 provides for a switching off of the receiver electrical circuit, except for an extremely small residual current consumed by the standby circuit itself. If the voltage monitored returns or increases, the standby circuit 17 switches the receiver to normal operation. The supply voltage of a microphone of a hearing aid, for example, could be a monitored voltage, whereby, upon turning off the hearing aid, the receiver according to the invention, which is coupled to the hearing aid in this case, is switched to standby operation.

Figure 2:
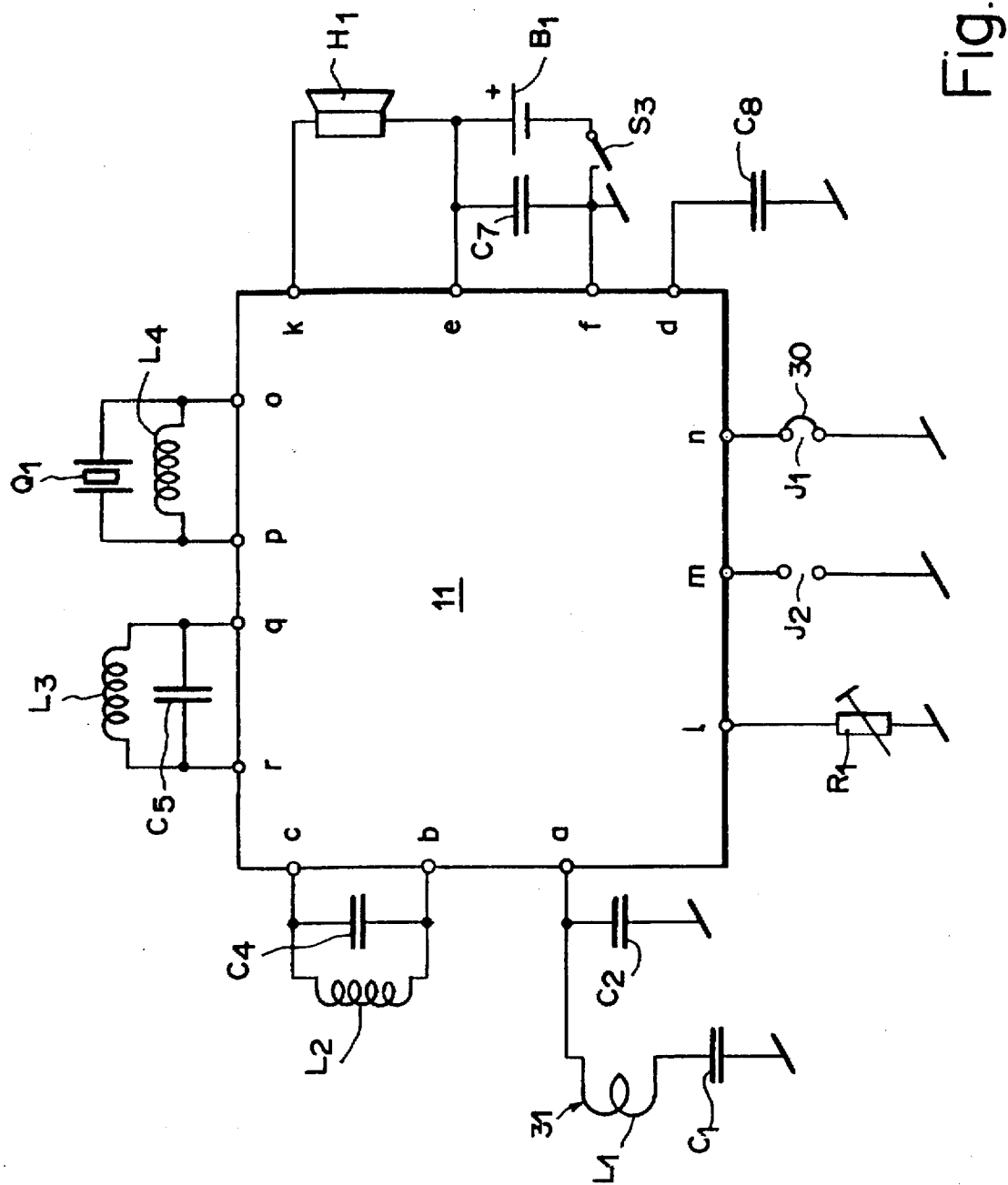
FIG. 2 is a circuit diagram showing the wiring of the integrated circuit of FIG. 1 with external components for producing a receiver to be worn in the external auditory canal of a person.

Shown in FIG. 2 is an electronic circuit with the previously described integrated circuit 11 which is suitable for realizing a complete FM receiver with a total volume of less than 1 $cm^3$. All the external components shown in FIG. 2, such as capacitances Cn, inductances Ln, jumpers J1, J2, resistor R1, quartz Q1, battery B1 and earphone H1, are included within the volume. A micro-receiver of this kind accommodated in a housing 33 (FIG. 3) can be worn by a person without it being seen.

Connected to connection point a of the integrated circuit 11 is a magnetically operating antenna. The antenna includes a loop L1 whose one end is connected to connection point a and whose other end is serially connected to a capacitor C1, the other connection of which leads to a neutral terminal. Parallel to the connection in series is a matching capacitor C2. The magnetically operating antenna 31 is matched to a radio receiver which is worn in the external auditory canal of a person. The human body acts as an electric conductor on whose surface the arising radio waves induce high frequency currents which, for their part, generate next to the skin of the body a high frequency magnetic field which is stronger than that contained in the arising waves themselves. The human body acts thereby as a receiving antenna to which is coupled the magnetically operating antenna described above.

The loop L2 and the capacitor C4 which represent a parallel resonant circuit, are connected to connection points b, c of the integrated circuit and are responsible for the selectivity of the high frequency amplifier. The loops L3, L4, the capacitor C5 and the quartz Q1 are connected via connection points o, p, q and r to the oscillator circuit of the integrated circuit 11 and generate together with the latter the oscillator frequency already mentioned. The battery B1 is connected via a switch S3 to connection points e, f of the integrated circuit 11. The filter capacitor C7 lies parallel to battery B1 when switch S3 is closed. The connection point f of the integrated circuit, which is connected to the minus pole of the battery when switch S3 is closed, forms the neutral terminal.

Of the connection points m, n which are connected to the tone correction element of the integrated circuit 11, only connection point n is connected to the neutral terminal using a means 30, a wire bridge or the jumper J1. This is because in the foreseen applications mentioned here there is practically always a phase-modulated signal to be processed. The changeable resistor R1, which is connected to connection point 1, serves to adjust the loudness level of the low frequency signal given by the low frequency amplifier to connection point k, which signal is made audible by earphone H1 connected between connection point k and the plus pole of the battery. Connection point k, to which one of the previously described three output ends of the low frequency amplifier ends, has an output impedance which, for matching earphone H1, essentially corresponds to the impedance of earphone H1.

The capacitor C8, which is connected to connection point d, is a balancing capacitor for the voltage multiplier previously described.

Figure 3:
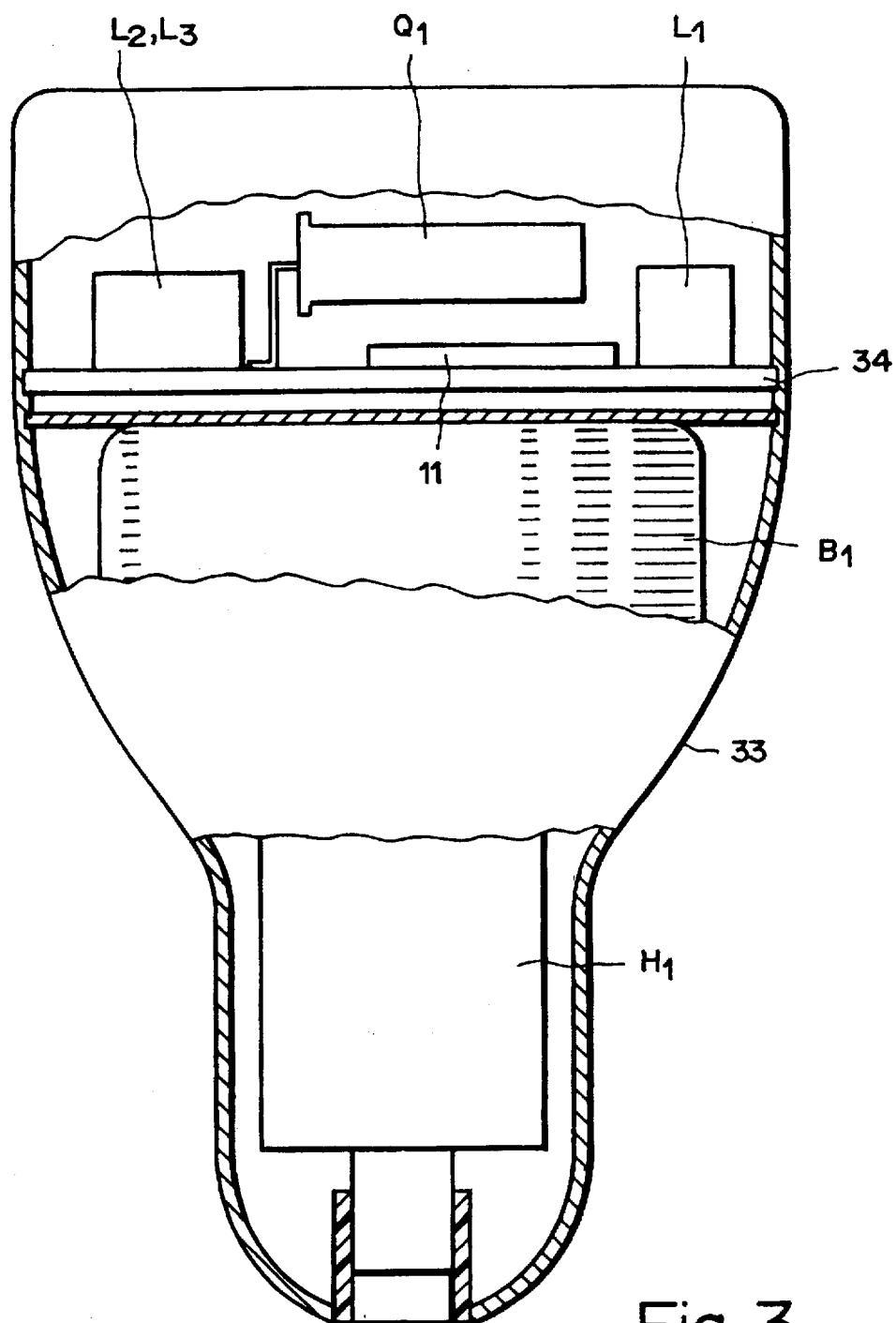
FIG. 3 is an illustration of the constructive arrangement of individual structural components for producing a receiver to be worn in the external auditory canal of a person.

The construction design of a micro-receiver which can be worn in the external auditory canal of a person, is shown in FIG. 3. The largest elements inside a housing 33, which corresponds essentially in form and size to a housing of a hearing aid worn in the ear, are the battery B1, the earphone H1 as well as a printed circuit board 34 on which are mounted the integrated circuit 11, the quartz Q1 and the other external components, of which only loops L1 to L3 are visible. Although it is not shown here, this receiver could also be designed additionally equipped with the aforementioned electrically operating antenna.

Figure 4:
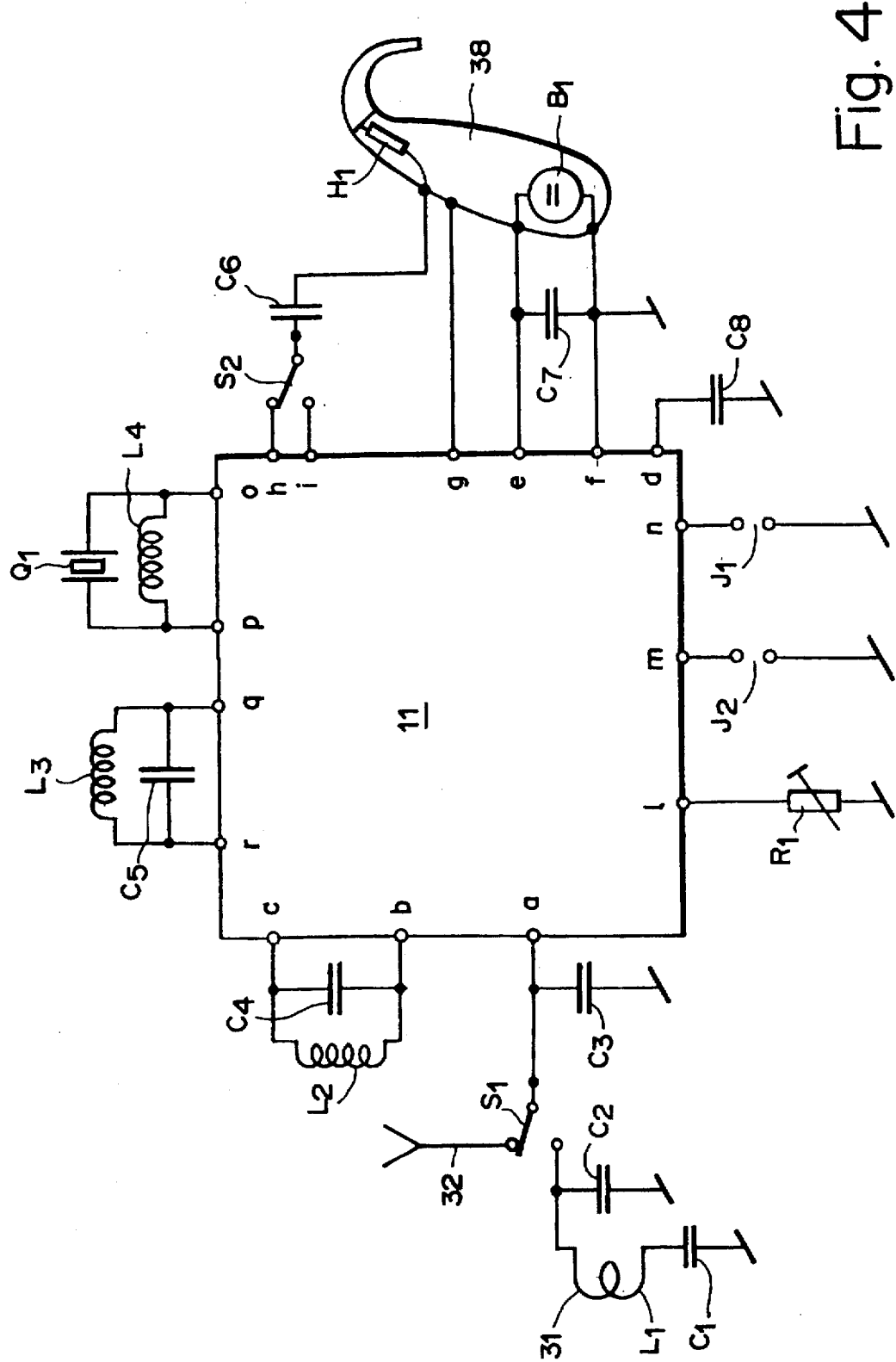
FIG. 4 is a circuit diagram showing the wiring of the integrated circuit of FIG. 1 with external components for producing an accessory for a hearing aid to be worn behind the ear.

Shown in FIG. 4 is a circuit with the integrated circuit 11 which forms a micro-receiver connectable both mechanically and electrically to a hearing aid as an accessory. The external components, which are connected to connection points b, c, d, e, m, n, o, p, q and r, correspond to those already mentioned previously in describing FIG. 2, and are thus not described a second time here. When coupled to the hearing aid 38, which in this case is a hearing aid worn behind the ear, the receiver shown in this example is fed through electrical connections by the battery B1 disposed in the hearing aid. The battery is constantly connected to connection points e and f, already described, over which lies the filter capacitor C7. A connection line between the hearing aid and connection point g senses the filtered microphone supply voltage of the hearing aid and provides for standby operation of the receiver when the microphone supply voltage is interrupted. Earphone H1, likewise disposed in hearing aid 38, is connected via a coupling capacitor C6 and a switch S2 either to connection point h or connection point i of the integrated circuit. The two connection points, to which low frequency terminals of the low frequency amplifier, already described, are connected, differ through a different impedance at the output end. By displacement of switch 62 in the one or the other position, the hearing aid will be set so that the sound flowing from the microphone of the hearing aid is weakened with respect to the sound received by the microreceiver, or that, in the other position, both the sound flowing from the microphone and the sound from the receiver are received at about equal loudness level.

By means of a further switch S1, a changeover can be made from the magnetically operating antenna, previously described, to an electrically operating antenna, for example a wire antenna, rod antenna or loop antenna.

Figure 5:
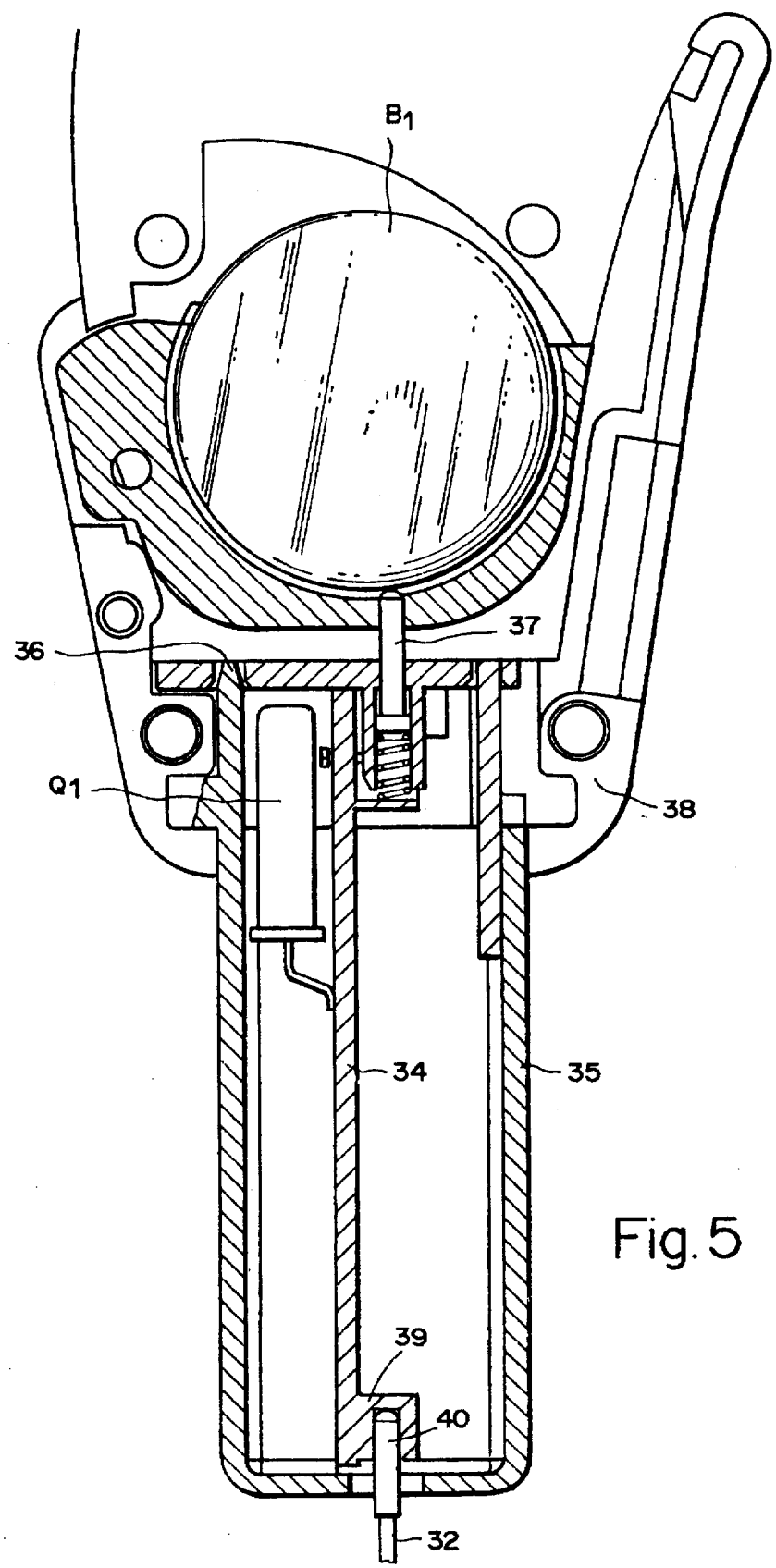
FIG. 5 is an illustration of the constructive arrangement of the receiver as an accessory to a hearing aid.

FIG. 5 illustrates an embodiment of the receiver conceived as a hearing aid accessory. Indicated by 38 is the lower part of the housing of a behind-the-ear hearing aid in which the battery B1 is usually disposed in a battery drawer. The hearing aid accessory is accommodated in separate housing 35, which can be detachably fastened to housing 38 of the hearing aid by means of mechanical fasteners 36. The necessary electrical connections to the hearing aid are provided via electrical connecting means 37, of which only a spring pin is visible which makes contact with one pole of the battery. The printed circuit board 34 is visible inside the housing 35 of the receiver; drawn on this board is only the quartz Q1, but not the integrated circuit 11 and the other external components shown in FIG. 4. On the end of housing 35 remote from the hearing aid housing 38 is an opening through which the electrically operating antenna 32 can be introduced with a connection pin into an antenna socket 39 which is likewise counted on the printed circuit board 34. When electrically operating antenna 32 is introduced, the functioning of magnetic antenna 31 is interrupted.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A micro-receiver for receiving a high frequency frequency or phase-modulated signal, comprising:

an oscillator circuit implemented in bipolar technology;

a mixer circuit implemented in bipolar technology and which mixes the high frequency modulated signal transmitted to the mixer circuit with a signal generated by the oscillator circuit and generates an intermediate frequency signal;

a CMOS intermediate frequency circuit, a CMOS demodulator circuit and a CMOS low frequency amplifier circuit coupled in that order to the mixer circuit and from which an audio-frequency signal can be given out;

an electricity source which is a single-cell battery or a single cell accumulator and has a voltage of at most 1.8 volts to supply electrical energy;

wherein at least the oscillator circuit, the mixer stage circuit, the intermediate frequency circuit, the demodulator circuit and the low frequency amplifier circuit are contained in at most two integrated circuits which further include a voltage multiplier circuit to produce a voltage higher than voltage of the electricity source and apply the higher voltage to the oscillator circuit and the mixer circuit; and a magnetically operating antenna, plural non-integrated components and means for generating an acoustic signal, wherein the at most two integrated circuits, the electricity source, all nonintegrated components, the magnetically operating antenna and said means for generating an acoustic signal are housed in a housing insertable in the external auditory canal of a person.

2. The micro-receiver of claim 1, wherein said at most two-integrated circuits further comprise a high frequency amplifier circuit, a low pass filter circuit and a muting or squelch circuit.

3. The micro-receiver of claim 1, comprising an adjustable tone correction circuit which is adjustable to correct tone of a demodulated frequency-modulated signal or a demodulated phase-modulated signal.

4. The micro-receiver of claim 1, comprising an electrically operating antenna.

5. The micro-receiver of claim 4, wherein said electrically operating antenna is selected from the group consisting of a wire antenna, a rod antenna and a loop antenna.

6. The micro-receiver of claim 4, comprising means for switching between said magnetically operating antenna and said electrically operating antenna.

7. The micro-receiver of claim 1, wherein all the components of the intermediate frequency circuit are integrated completely in one of the at most two integrated circuits.

8. The micro-receiver of claim 2, comprising:

means for matching the bandwidth of the low pass filter circuit to the level of the high frequency signal received so that the pass band of the low pass filter circuit is decreased as the level of the high frequency received signal decreases.

9. The micro-receiver of claim 1, comprising an electrically operating antenna detachably mounted from outside the housing, in a mounted state thereof, the operation of the magnetically operating antenna disposed in the housing being switchable to said electrically operating antenna.

10. The micro-receiver of claim 1, wherein said mixer circuit outputs an intermediate frequency signal in a frequency range of between 15 and 50 kHz.

11. The micro-receiver of claim 10, wherein said intermediate frequency circuit includes a CMOS filter and a CMOS amplifier.

12. The micro-receiver of claim 1, wherein said electricity source is a hearing aid battery.

13. A micro-receiver for receiving a high frequency frequency or phase-modulated signal, comprising:

an oscillator circuit implemented in bipolar technology;

a mixer circuit implemented in bipolar technology and which mixes the high frequency modulated signal transmitted to the mixer circuit with a signal generated by the oscillator circuit and generates an intermediate frequency signal;

a CMOS intermediate frequency circuit, a CMOS demodulator circuit and a CMOS low frequency amplifier circuit coupled in that order to the mixer circuit and from which an audio-frequency signal can be given out; and wherein at least the oscillator circuit, the mixer stage circuit, the intermediate frequency circuit, the demodulator circuit and the low frequency amplifier circuit are contained in at most two integrated circuits which further include a voltage multiplier circuit to produce a voltage higher than voltage of the electricity source and apply the higher voltage to the oscillater circuit and the mixer circuit; and a magnetically operating antenna and plural non-integrated components, wherein the non-integrated components and the magnetically operating antenna are accommodated in a housing, connecting means being provided on the housing for mechanical and electrical connection of the receiver to a hearing aid having an electricity source to supply electrical energy, so that when connected to the hearing aid the micro-receiver is powered by the electricity source of the hearing aid and an audio-frequency signal of the receiver is audible with the hearing aid.

14. The micro-receiver of claim 13, comprising an electrically operating antenna detachably mounted from outside the housing, in a mounted state thereof the operation of the magnetically operating antenna disposed in the housing being switchable to said electrically operating antenna.

15. The micro-receiver of claim 13, comprising a standby circuit provided on one of the at most two integrated circuits to limit current to the receiver to essentially zero current when the hearing aid is turned off.

16. The micro-receiver of claim 13, wherein said micro-receiver is operable upon receiving a voltage of at most 1.8 volts from said electricity source of said hearing aid.

* * * * *